No. 890,181.
PATENTED JUNE 9, 1908.
V. ROYLE.
SUBJECT SQUARING GAGE.
APPLICATION FILED NOV. 1, 1905.
2 SHEETS—SHEET 2.
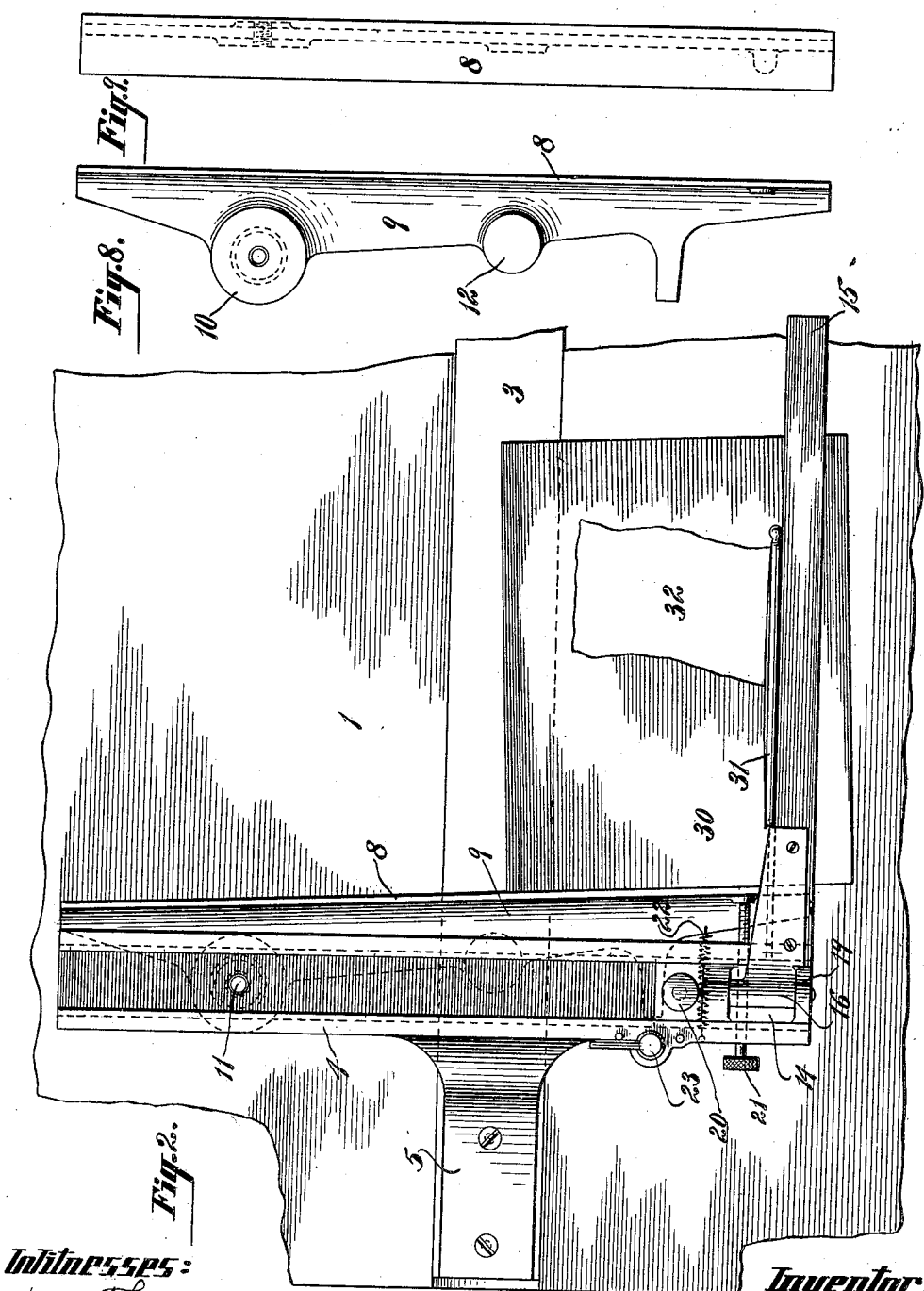

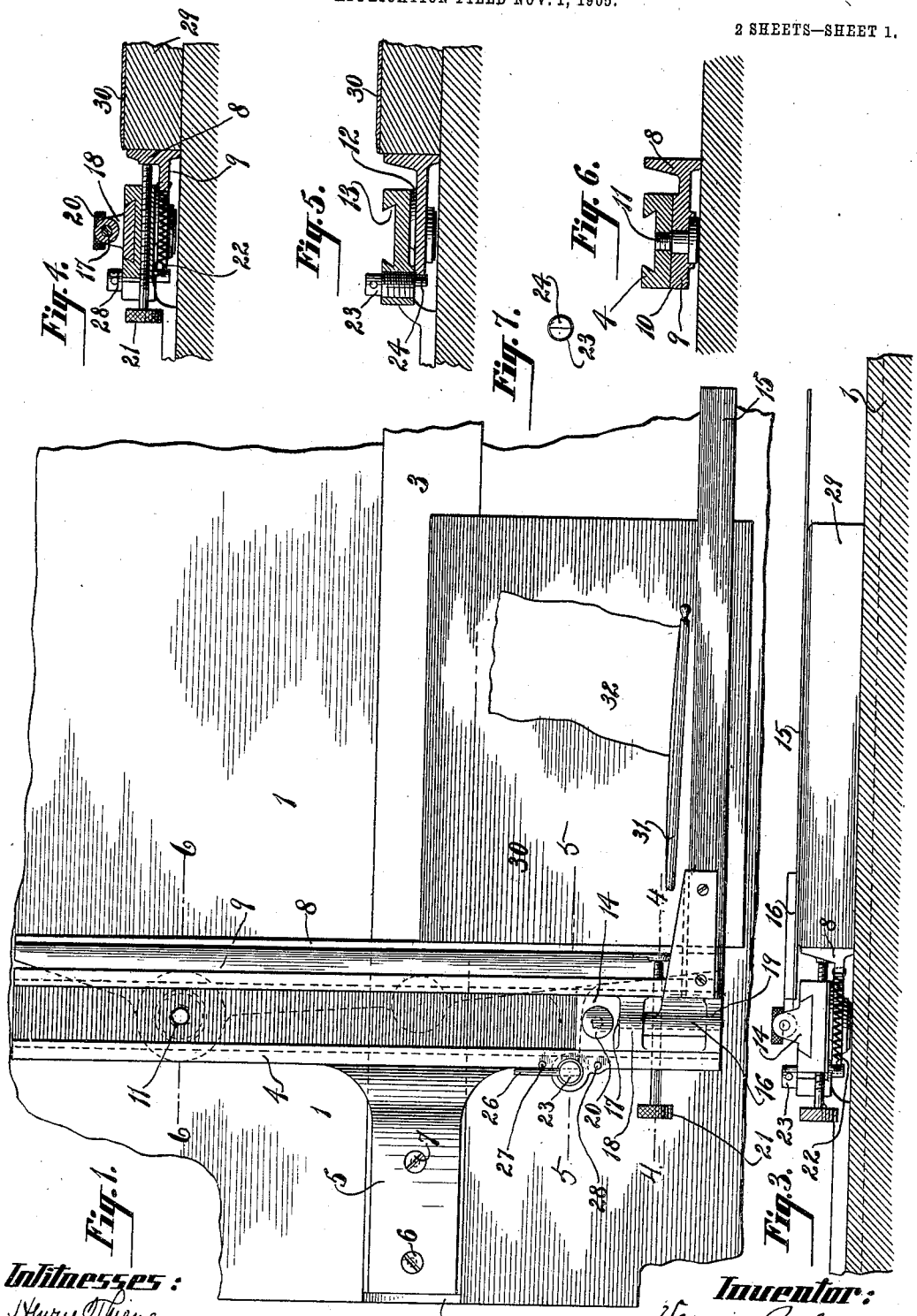

UNITED STATES PATENT OFFICE.

VERNON ROYLE, OF PATERSON, NEW JERSEY.

SUBJECT-SQUARING GAGE.

No. 890,181.  Specification of Letters Patent.  Patented June 9, 1908.

Application filed November 1, 1905. Serial No. 285,381.

*To all whom it may concern:*

Be it known that I, VERNON ROYLE, a citizen of the United States, and resident of Paterson, in the county of Passaic and State of New Jersey, have invented a new and useful Improvement in Subject-Squaring Gages, of which the following is a specification.

My invention relates to a subject squaring gage for determining the line along which the plate and its supporting block are to be cut to make the border line of the plate harmonize with the position line of the subject delineated on the plate.

In electrotype and photo-engraving plates from which printing is to be done it frequently happens that the plate containing the subject to be printed will be secured to its supporting block with the position of the subject out of harmony with the border line of the plate, that is, oblique to the border line when it should be parallel thereto or at right angles thereto.

My present invention is directed to a gage which may be readily manipulated to indicate on the plate the line along which the plate and its supporting block may be cut to true or square it as it is commonly called, with respect to the subject.

In the accompanying drawings, Figure 1 is a top plan view of a portion of a tool showing the gage supported thereon in position for use and also showing a plate thereon with the subject delineated on the plate, in the present instance a flag and staff, out of true with respect to the margin of the plate. In this view the horizontally rocking member of the gage is shown in position at right angles to the longitudinally movable and vertically rocking member. Fig. 2 is a similar view showing the horizontally rocking member of the gage rocked to bring the plate to be cut into position with its position line, in the present instance the flag staff, parallel with the other member of the gage for indicating the line along which the plate is to be cut to true it with respect to the subject. Fig. 3 is a view of the same in side elevation, the parts occupying the positions which they assume in Fig. 1. Fig. 4 is a vertical section in the plane of the line 4—4 of Fig. 1. Fig. 5 is a vertical section in the plane of the line 5—5, Fig. 1. Fig. 6 is a vertical section in the plane of the line 6—6 of Fig. 1. Fig. 7 is a bottom plan view of the stop for regulating the backward swing of the horizontally rocking member. Fig. 8 is a top plan view in detail of the horizontally rocking member of the gage, and Fig. 9 is a face view of the same.

1 represents a table which may be the table of the sawing machine or other suitable cutter to which the gage is to be applied. This table 1 is provided with a dovetailed or undercut groove 2 extending longitudinally along its face in which a bar 3 fits and slides the bar 3 forming a support for the gage as a whole.

The gage proper comprises a supporting track in which one member of the gage rocks horizontally and along which another member of the gage slides longitudinally, the second member of the gage being further provided with an arm at right angles to its stock and hinged to its stock to swing in a vertical plane. The said supporting track is denoted by 4 and extends transversely across the table 1. The said track is provided with a stem 5 formed integral with or rigidly secured to the track, the said stem being fitted to rest in close contact with the top of the bar 3 to which it is removably secured, in the present instance by means of screws 6 and 7. The track is held by means of the stem 5, a short distance above the plane of the table 1 and to its underside there is pivotally secured the horizontally rocking member 8 of the gage. The member 8 is conveniently made of a general T-shape in cross section as clearly shown in Figs. 4, 5 and 6. The web portion 9 extending underneath the track 4 where it is provided near one end with a boss 10 through which the pivot screw 11, extends into the underside of the track 4. To give the member 8 additional bearing in its swinging movement and at the same time leave it free from contact with the track and table throughout the greater portion of its length, I provide it with a bearing boss 12 intermediate of its pivotal connection and its end furthest therefrom, the intention being that the member 8 shall swing into and out of position between the track and the face of the table with the boss 12 in sliding contact with the underside of the track. The face of the member 8 is upright as shown and of sufficient depth to insure a firm rest for the side of the block which engages it. In the top of the track 4 there is formed a dovetailed or undercut groove 13 in which the stock 14 of the other member of the gage is received with a longitudinally sliding fit. The stock 14 has hinged thereto an arm 15, the arm 15 extending at right angles to the stock and as here shown at right angles to the longitudinal axis of the track 4. The arm 15 is pivoted to the stock 14 by means of a socket piece 16 made fast to the arm 15 and a pintle 17 extending through the socket piece 16 and bearing in brackets 18 and 19 uprising from the stock 14. The stock 14 is locked in its longitudinally sliding adjustment in the track 4 by means of a set screw 20 tapped therein in position to be screwed into and out of engagement with the bottom of the undercut groove 13.

The rocking member 8 is rocked by means of a thumb screw 21 extending transversely through and seated in the track 4, the free end of said screw bearing against the back of the upright head or face of the said member, the said screw working in opposition to a retracting spring 22 located beneath the track and tending to draw the free end of the member 8 back against the end of the screw 21.

For the purpose of limiting the backward swinging of the member 8 under the impulse of the spring 22 at the point where its face will be at right angles to the arm 15, I locate a stop 23 in the track 4 and permit it to project below the stock sufficiently to engage the web 9 of the member 8 when the member 8 has reached a position at right angles to the arm 15. At the same time it is desirable that the member 8 should in some instances be swung back of this perpendicular position and to provide for this I cut away the projecting lower end of the stop 23, leaving a half-round projection 24, see Fig. 5, and provide the stop with an operating handle 26 so that when it is desired to bring the member 8 back to a position just at right angles to the arm 15, the stop 23 may be swung into the position Fig. 1, with its lever 26 against the pin 27 and when it is desired to swing the member 8 back of this position at right angles to the arm 15, the stop 23 may be turned half round by swinging its lever 26 against the pin 28, thereby throwing the projection 24 off to the opposite side of the stop or side furthest from the member 8 and permitting the latter to swing back of the position at right angles to the arm 15. In extreme cases where it is desirable to swing the arm further than allowed by turning the stop half round, the said stop 23 may be unscrewed a distance sufficient to withdraw the projection 24 from the path of the member 8, permitting the latter to swing still further back of its position perpendicular to the arm 15.

In operation, assume a block 29 with plate 30 fast thereon and bearing an emblem consisting of a staff 31 with flag 32 to be in hand with a view of cutting the plate or block to make its sides and ends respectively parallel to the longitudinal axis of the staff 31 and at right angles to said axis. The plate having been placed in the position shown in Fig. 1, it is at once observed that the axis of the staff 31 is oblique to the margin of the plate and having placed the block with plate thereon against the face of the member 8 with the arm 15 in proximity to the staff at one end, the screw 21 may be turned, rocking the member 8 into the position shown in Fig. 2, thereby tilting the block 29 and plate thereon into a position to bring the longitudinal axis of the staff 31 parallel to the edge of the arm 15. This having been done, the block may be cut along the line indicated at the outer edge of the arm 15 or the block may be slid inwardly until the outer edge of the arm 15 reaches the outer edge of the block at one corner and a line may then be drawn along the edge of the arm 15 to indicate the line of cut. The plate having been cut or lined and cut parallel with an edge of the arm 15, for instance by sliding the table 1 along into contact with a suitable saw or other cutter not shown, the same forming no part of my present invention, the block 29 with plate thereon may then be placed with its cut side against the face of the member 8 and the latter swung back into position at right angles to the arm 15. This will bring the end of the block and plate in position to be cut at right angles to the position line, viz: the longitudinal axis of the staff 31 and the block and plate may then be cut along this line guided by the eye, the line and the gage arm 15, or a line may be drawn with the arm 15 as a guide and the arm 15 may then be swung back out of the way and the block cut along this line. In like manner the plate may be turned with the last cut end against the face of the member 8 and the other side cut parallel with the first cut and then in turn the block may be again brought with its side against the face of the member 8 and the other side cut to square it.

In putting the plate in position on the table and removing it therefrom, the arm 15 may be swung back out of the way and to accommodate long plates and short plates as may be required, the arm 15 may be bodily moved away from and toward the track 4 by sliding its stock 14 along the track and locking it in position by means of the set screw 20.

The structure as a whole is simple and provides for the rapid and accurate squaring of the plate with respect to the subject whatever be the size and condition of the plate within limits commonly encountered.

What I claim as my invention is:

1. A subject squaring gage comprising a suitable support, a horizontally rockable member located on one face of the support, a horizontally sliding member located on the opposite side of the support and means for positively arresting the movement of the said rockable member with reference to the sliding member.

2. A subject squaring gage comprising a horizontally rockable member, a member provided with a vertically rockable arm and means for adjusting the position of the horizontally rockable member at different angles to the vertically rockable arm.

3. A subject squaring gage comprising a horizontally rockable member, a member provided with an arm arranged to rock vertically and a stop for positively limiting the horizontally rockable member at right angles to the vertically rocking arm.

4. A subject squaring gage comprising a horizontally rockable member and a longitudinally sliding member provided with a vertically swinging arm and means for adjusting the said horizontally rockable member into a position at right angles to the said vertically swinging arm, at an obtuse angle to said vertically swinging arm and at an acute angle to the said vertically swinging arm.

5. A subject squaring gage comprising a track provided with means for spacing it from the table, a horizontally rockable member pivoted below the track, a horizontally sliding member mounted in the track and means for adjusting the members with relation to each other.

6. A subject squaring gage comprising a track provided with means for spacing it from the table, a horizontally rockable member pivoted near one end to the underside of the track and provided with a bearing intermediate of its pivotal point and end for preventing vibration, a member mounted in the track in position to co-act with the horizontally rockable member and means for adjusting the members with relation to one another.

7. A subject squaring gage comprising a track provided with means for spacing it from the table, a horizontally rockable member pivoted to the underside of the track, a retracting spring engaged with said member and with the track, a screw for rocking the said member against the tension of the spring and a gage member mounted in the track in position to coact with the aforesaid rockable member.

In testimony, that I claim the foregoing as my invention, I have signed my name in presence of two witnesses, this 12th day of October 1905.

VERNON ROYLE.

Witnesses:
 GEO. P. JIRDEN,
 JOHN ROYLE.